Patented Oct. 9, 1923.

1,470,512

UNITED ICE.

MARIUS E. TROMBA, OF BROOKLYN, NEW YORK.

CONDENSING LENS.

No Drawing.　　Application filed January 15, 1921.　Serial No. 437,627.

*To all whom it may concern:*

Be it known that I, MARIUS E. TROMBA, a citizen of the United States, and a resident of the city of New York, borough of Brooklyn, in the county of Kings and State of New York, have invented a new and Improved Condensing Lens, of which the following is a full, clear, and exact description.

The present invention relates to new and useful improvements in lenses and it pertains more particularly to improvements in condensing lenses adapted for use in projecting machines.

In certain types of projectors in order that great distances may be reached in projection, high-power lamps have been devised. It has been proven, however, that when high-power lamps are used for the projection of pictures and more particularly for the projection of motion pictures, in some cases the intensity of the light generated by these high-power lamps has been so great as to flood the picture with ultra-violet rays to such a degree as to change the color thereof to such an extent that the picture has a bluish cast which renders the same both unnatural in appearance and tiresome to the eyes.

When these lamps of high power are employed for projection purposes, the ordinary condensing lenses made of plain glass do not properly perform their function, and in order that a clear projection may be obtained, various schemes have been resorted to, such, for example, as staining the plain condensing lenses or coloring them with paint or other suitable material. Condensing lenses constructed as above, however, have been incapable of withstanding the severe temperature to which they are subjected and said temperature burns off the stain or paint thus applied to the condensing lenses and accordingly destroys the utility thereof.

It is one of the objects of this invention to provide a condensing lens by means of which the ultra-violet rays present in the light generated by the high-power lamps may be neutralized to such an extent that the deleterious effects thereof upon the picture to be projected are removed without detracting from the projecting power of the light beam.

It is a further object of the invention to provide a lens which will project the pictures in such a manner that they will be restful to the eyes.

It is a further object of the invention to produce a lens which by reason of its ability to eliminate or neutralize the ultra-violet rays will give greater light at the point of projections, and enhance thereby the quality of the picture.

It is a further object af the invention to construct a condensing lens in such a manner that the color of said lens will be permanent and unaffected by any degree of heat up to that degree at which the glass from which the lens is formed will fuse.

In carrying out the invention, glass, preferably that which is known as flint glass, is manufactured in the usual manner except that when the glass is in the molten state, uranium is combined therewith and mixed with the batch. After the glass has cooled and hardened, the mass has a yellow tint due to the presence of the uranium therein.

The above method of making yellow or uranium glass is not new and I do not make any claim thereto.

I have found, however, by actual use and experiment that lenses made from this glass, when used in projection apparatus in which the light beam is generated by a high-power lamp and in nature possessed of sufficient quantity of ultra-violet rays to ordinarily render the light impracticable for the purpose intended, will neutralize the said ultra-violet rays without impairing the intensity of the light rays and detracting from the projecting power thereof.

While in the foregoing description the invention is described as applicable to condensing lenses for projection machines, it is here stated that in addition to this use, the glass above mentioned has been found to be particularly adapted for use in all optical lenses, such as telescopes, opera glasses, automobile headlight lenses, search light lenses, and in fact, all lenses wherein it is desired to modify the beam projected therethrough by a neutralization of the ultra violet rays contained therein.

I claim—

1. A lens for projection apparatus, said lens being formed of colored glass, the coloring matter of the lens being of such a character to substantially cut off all the ultraviolet radiations without causing a massing of the color of said lens at any point in the projected light.

2. A lens for projection apparatus, said lens being provided with a tint of color caused by the embodiment of uranium in the mass of the medium forming said lens whereby the ultra-violet rays are neutralized and a greater quantity of light rays are permitted to pass through said lens.

MARIUS E. TROMBA.